United States Patent
Ahmed et al.

(10) Patent No.: US 12,082,990 B1
(45) Date of Patent: Sep. 10, 2024

(54) DENTAL IMPRESSION TRAY

(71) Applicant: KING FAISAL UNIVERSITY, Al-Ahsa (SA)

(72) Inventors: Naseer Ahmed, Karachi (PK); Rizwan Jouhar, Al-Ahsa (SA); Afsheen Maqsood, Karachi (PK); Asra Salahuddin, Karachi (PK); Muhammad Faheemuddin, Al-Ahsa (SA); Muhammad Adeel Ahmed, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/430,117

(22) Filed: Feb. 1, 2024

(51) Int. Cl.
A61C 9/00 (2006.01)
A61C 19/04 (2006.01)

(52) U.S. Cl.
CPC ............ A61C 9/0006 (2013.01); A61C 9/008 (2013.01); A61C 19/04 (2013.01)

(58) Field of Classification Search
CPC .......... A61C 9/006; A61C 9/008; A61C 19/04
See application file for complete search history.

(56) References Cited

U.S. PATENT DOCUMENTS

| 4,102,047 A * | 7/1978 | Walker ................. | G09B 23/283 |
| | | | 434/263 |
| 2004/0038173 A1* | 2/2004 | Brandhorst .......... | A61C 9/0006 |
| | | | 433/32 |
| 2005/0106528 A1* | 5/2005 | Abolfathi ............. | A61C 9/0006 |
| | | | 433/41 |
| 2006/0008762 A1* | 1/2006 | Friedman ............. | A61C 19/004 |
| | | | 433/29 |
| 2007/0166659 A1* | 7/2007 | Haase .................. | A61C 9/0006 |
| | | | 433/37 |
| 2012/0026307 A1* | 2/2012 | Price .................... | G09B 23/283 |
| | | | 348/66 |
| 2017/0100219 A1 | 4/2017 | Schmitt | |
| 2018/0296098 A1* | 10/2018 | Islam ................... | G01N 33/025 |
| 2020/0288982 A1* | 9/2020 | Islam ................... | G01N 21/359 |
| 2021/0386536 A1* | 12/2021 | Jesenko ............. | A61C 13/1016 |

(Continued)

FOREIGN PATENT DOCUMENTS

| CN | 204092242 U | 1/2015 |
| CN | 206630706 U | 11/2017 |
| WO | 2017048918 A1 | 3/2017 |

OTHER PUBLICATIONS

G Nishigawa, Y Maruo, M Irie, M Oka, Y Tamada, S Minagi "New theoretical model to measure pressure produced during impression procedure for complete dentures—Visual inspection of impression material flow" DOI: 10.1016/j.dental.2013.02.005.

(Continued)

*Primary Examiner* — Nicholas D Lucchesi
(74) *Attorney, Agent, or Firm* — Nath, Goldberg & Meyer; Joshua B. Goldberg

(57) ABSTRACT

A pressure sensor dental impression tray is provided and designed for both the maxilla and the mandible. The dental impression trays provide real-time feedback to prosthodontists regarding the force applied during the impression procedure and incorporate an array of pressure sensors and an analog to digital meter to measure and display the applied force in real-time.

15 Claims, 3 Drawing Sheets

(56) References Cited

U.S. PATENT DOCUMENTS

2023/0277065 A1\* 9/2023 Islam .................. A61B 5/1455
433/29
2023/0320817 A1\* 10/2023 Leviton ................. G16H 80/00
433/24

OTHER PUBLICATIONS

Haby Mathew Somson, Pradeep Kumar C, Alex Mathew M, Sherin Sara George, Rajeev Soangra, and Jitendra Acharya, "Pressure Characteristics of Maxillary and Mandibular Edentulous Impressions: an In-vitro Study" DOI:10.37821/ruhsjhs.5.1.2020.39-45.

\* cited by examiner

DENTAL IMPRESSION TRAY

TECHNICAL FIELD

The present disclosure belongs to the technical field of dental impression making; as a tool in fabricating prosthodontic restorations for dental patients.

BACKGROUND

People are increasingly paying attention to dental health both as a health concern and for improved self-esteem while in social situations. Accordingly, the prevention of dental caries and periodontal disease as well as treatment of lost teeth leads to an improvement in the standard of living of the general population. The specialty of prosthodontics deals with replacement and restoration of lost and missing teeth that is an acceptable solution to restore esthetics, function, and phonetics to enhance oral and general health.

Dental impressions play a crucial role in prosthodontics, serving as the foundation for the fabrication of various dental prostheses such as crowns, bridges, and dentures. The accuracy and precision of these impressions are paramount to the success of subsequent dental procedures, ensuring proper fit, function, and aesthetics of the definite prosthodontic restoration.

Conventional dental impression techniques involve the use of impression materials within trays, relying heavily on the skill and experience of the prosthodontist to apply the right amount of pressure consistently. Despite the advancements in dental materials and techniques, the subjective nature of the pressure applied during the impression process remains a challenge. Prosthodontists must rely on their tactile sense and visual estimation to gauge the force exerted, leading to variations in pressure application. Inconsistencies in pressure can result in inaccurate impressions, leading to the need for re-impressions, increased chair time, and potential discomfort for the patient. The traditional methods lack a precise and quantifiable measurement of the force applied during the impression process. Furthermore, consistency is vital in dental impressions to avoid variations in the quality of molds. The inaccuracies in conventional impressions often lead to the need for re-impressions, causing inconvenience for both the prosthodontist and the patient.

In conclusion, there are longstanding challenges in traditional dental impression techniques of precision, consistency, and efficiency in prosthodontic practice. The need for innovation is evident in the quest for higher standards of dental care, reduced errors, enhanced patient comfort, and the optimization of prosthodontic procedures.

SUMMARY

The traditional methods of prosthodontics lack a precise and quantifiable measurement of the force applied during the impression process. The Pressure Sensor Dental Impression Trays as described herein address this gap by incorporating pressure sensors and a digital analog meter, providing real-time feedback on the force applied. This technology ensures a higher level of precision and accuracy in the impressions, reducing the likelihood of errors.

Furthermore, consistency is vital in dental impressions to avoid variations in the quality of molds. The present trays offer a standardized approach by providing force guidance, suggesting optimal pressure levels for different areas of the maxilla and mandible. This feature promotes a more consistent and reliable impression technique across various cases.

Another key aspect of the present subject matter is the provision of real-time feedback from the pressure sensors, which helps prosthodontists make immediate adjustments, reducing the chances of errors and the need for costly re-impressions.

Moreover, it is important to note that a well-executed dental impression not only contributes to the accuracy of prosthetic devices but also enhances patient comfort. The present Pressure Sensor Dental Impression Trays ensure that the force applied is optimized for comfort while maintaining the necessary pressure for accurate impressions.

Further, the integration of real-time feedback and data logging capabilities streamlines the dental impression process, making it more efficient. Prosthodontists can make on-the-spot adjustments, potentially reducing the overall chair time and improving the workflow in dental practices.

As such, the present pressure sensor dental impression trays address longstanding challenges in traditional dental impression techniques, offering a comprehensive solution to improve precision, consistency, and efficiency in prosthodontic practice. The need for such innovation is evident in the quest for higher standards of dental care, reduced errors, enhanced patient comfort, and the optimization of prosthodontic procedures.

A first embodiment of the present subject matter relates to a device used to fabricate an impression of a maxilla arch using a maxilla arch tray. This embodiment can include a tray handle attached to a tray body, a digital meter located with the handle, and three lines of pressure sensors integrated into the tray body along the left alveolar ridge, right alveolar ridge, and the posterior palatine, respectively. The sensors can provide pressure data, which is then used to generate accurate impression data.

A second embodiment of the present subject matter is a device to fabricate an impression of a patient's mandibular arch using a mandibular arch tray. It includes a tray handle attached to a tray body, a digital meter located with the handle, and two lines of pressure sensors integrated into the tray body along the left alveolar ridge and right alveolar ridge, respectively. The sensors can provide pressure data, which is then used to generate accurate impression data.

These and other features of the present subject matter will become readily apparent upon further review of the following specification and drawings.

BRIEF DESCRIPTION OF THE DRAWINGS

For a clearer description of the technical solutions of the embodiments of the present subject matter, the drawings that are needed in the description of the embodiments will be briefly introduced below, it being obvious that the drawings in the description below are only some embodiments of the present subject matter, and that other drawings can be obtained according to these drawings without inventive effort for a person skilled in the art, wherein.

DETAILED DESCRIPTION

Figure 1:
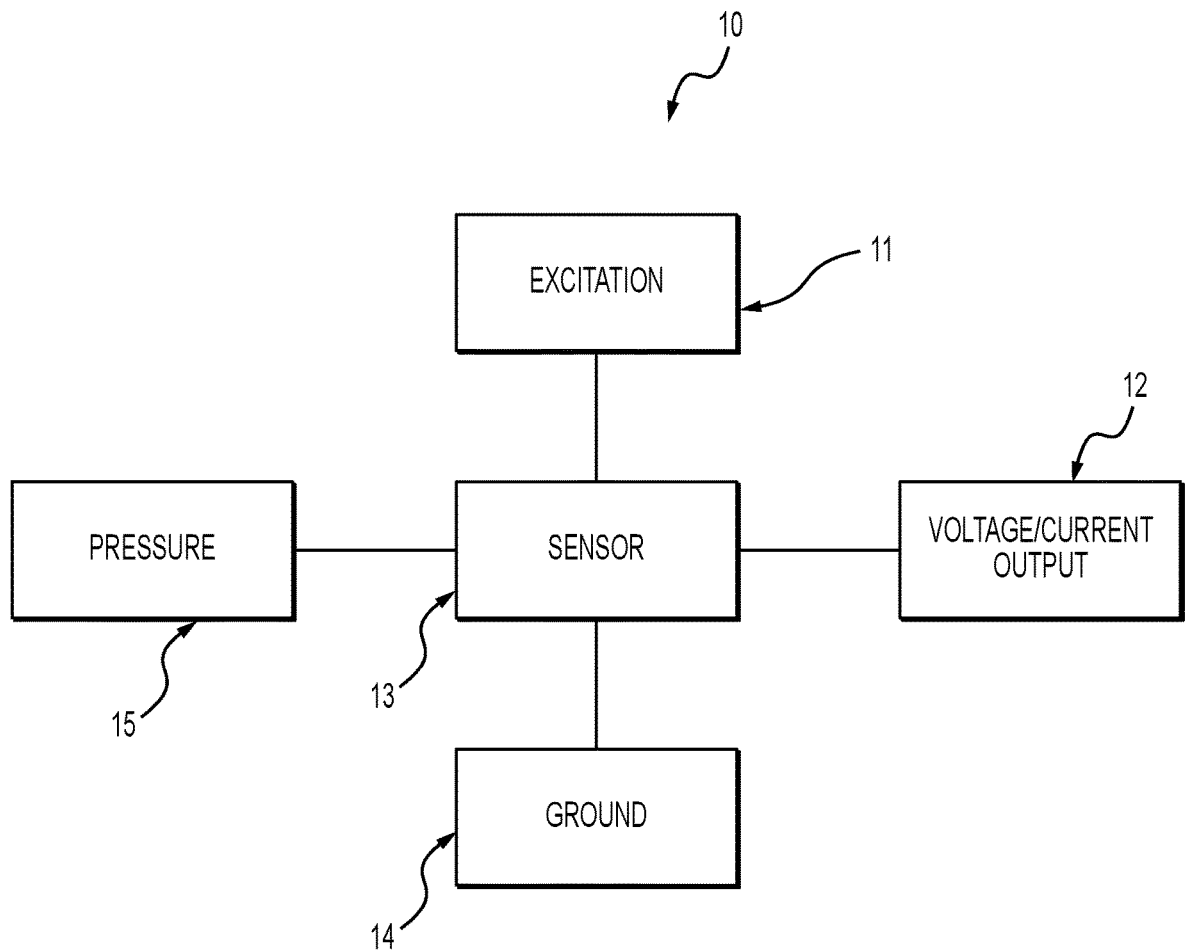
FIG. 1 is a schematic view of the pressure sensor mechanism employed by the maxilla arch dental impression tray and the mandibular arch dental impression tray.

In order that the above objects, features and advantages of the present subject matter will be readily understood, a more particular description of the present subject matter will be rendered by reference to the appended drawings. It is to be understood that the specific embodiments described herein are for purposes of illustration only and are not intended to limit the scope of the present subject matter. It should be further noted that, for convenience of description, only some, but not all of the structures related to the present subject matter are shown in the drawings. All other embodiments, which can be made by those skilled in the art based on the embodiments of the subject matter as described herein without making any inventive effort, are intended to be within the scope of the present subject matter.

Reference herein to "an embodiment" means that a particular feature, structure, or characteristic described in connection with the embodiment may be included in at least one embodiment of the present subject matter. The appearances of such phrases in various places in the specification are not necessarily all referring to the same embodiment, nor are separate or alternative embodiments mutually exclusive of other embodiments. Those of skill in the art will explicitly and implicitly appreciate that the embodiments described herein may be combined with other embodiments.

In the description of the present subject matter, the terms "first," "second," and the like are used for descriptive purposes only and are not to be construed as indicating or implying relative importance or implicitly indicating the number of technical features indicated. Thus, a feature defining "a first" or "a second" may explicitly or implicitly include one or more of the described features. In the description of the present subject matter, the meaning of "a plurality" is two or more, unless explicitly defined otherwise.

In this specification, unless explicitly stated and limited otherwise, the "upper" or "lower" of a first feature relative to a second feature may include the first and second features being in direct contact, or may include the first and second features not being in direct contact but being in contact with each other through another feature therebetween. Moreover, a first feature being "above," "over" and "on" a second feature includes the first feature being directly above and obliquely above the second feature, or simply indicating that the first feature is higher in level than the second feature. The first feature being "under", "below" and "beneath" the second feature includes the first feature being directly under and obliquely below the second feature, or simply means that the first feature is less level than the second feature.

Throughout the application, where compositions or products are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

As described herein, "pressure sensors" can be embedded within the dental impression trays, strategically placed within the tray structure. These sensors can instantly detect and measure the force applied during the impression process, providing real-time data on the pressure exerted to prosthodontists, a pivotal factor in achieving the desired impression quality.

As described herein, an "analog to digital meter" can be an integral part of the dental impression trays, which operates in tandem with the pressure sensors. This meter can provide a clear and instantaneous display of the force being applied to any one or more pressure sensors. This real-time feedback can empower prosthodontists to make immediate adjustments to the force as needed during the impression taking process, ensuring a previously unattainable level of accuracy and reliability.

As described herein, "force guidance" is indicative of the ability of the present dental impression trays to provide prosthodontists with guidance on the appropriate force levels for various areas of the maxilla and mandible. By seamlessly incorporating established standards and clinical guidelines for dental impressions, the present trays can offer on-the-spot recommendations for the ideal force to be applied in specific regions. This unique feature can significantly reduce the likelihood of errors or inconsistencies, ensuring consistent, high-quality impression.

As described herein, "data logging" relates to the ability of the present dental impression trays to record and store relevant data from the impression process. This comprehensive record-keeping can provide invaluable insights, allowing for a thorough review and analysis of the procedures employed in minute detail, thereby promoting ongoing improvement and consistency.

FIG. 1 depicts an arrangement of the pressure sensor mechanism (10) as at each embedded sensor location in the first embodiment of the maxillary arch dental impression tray (20) and the second embodiment of the mandibular arch dental impression tray (40). The pressure sensor mechanism (10) includes an excitation source (11) connected to a pressure sensor (13). The pressure sensor (13) is also connected to ground (14). The pressure sensor (13) accepts as input, a source of pressure (15) applied from the molding material which itself transmits pressure from the patient's biting action during the impression procedure. The feedback from the sensor (13) is provided in real-time to prosthodontists where the feedback regarding the force applied by the patient thereby guarantees a verification of the precise application of pressure and ultimately leads to more accurate and superior dental impressions. The feedback from the pressure sensor is converted to voltage or current output analog output (12) for transmission to an analog to digital meter in the first and second tray embodiments and thus provides the prosthodontist with real-time feedback, thus empowering the prosthodontist to make immediate adjustment to the force as needed during the impression procedure, ensuring a level of accuracy and reliability previously unattainable.

While the precise range of recommended force levels to create the dental impressions herein can vary depending on the specific area and the impression material being used, general guidelines exist. For alginate impressions, the recommended range typically falls between about 15 and about 40 psi, where psi stands for pounds per square inch, while for polyvinyl siloxane (PVS) impressions, the range is generally set at about 20 to about 50 psi. Adherence to precise recommendations is vital and following the standards and accepted guidelines established by the relevant dental authorities and organizations to guarantee optimal results.

Figure 2:
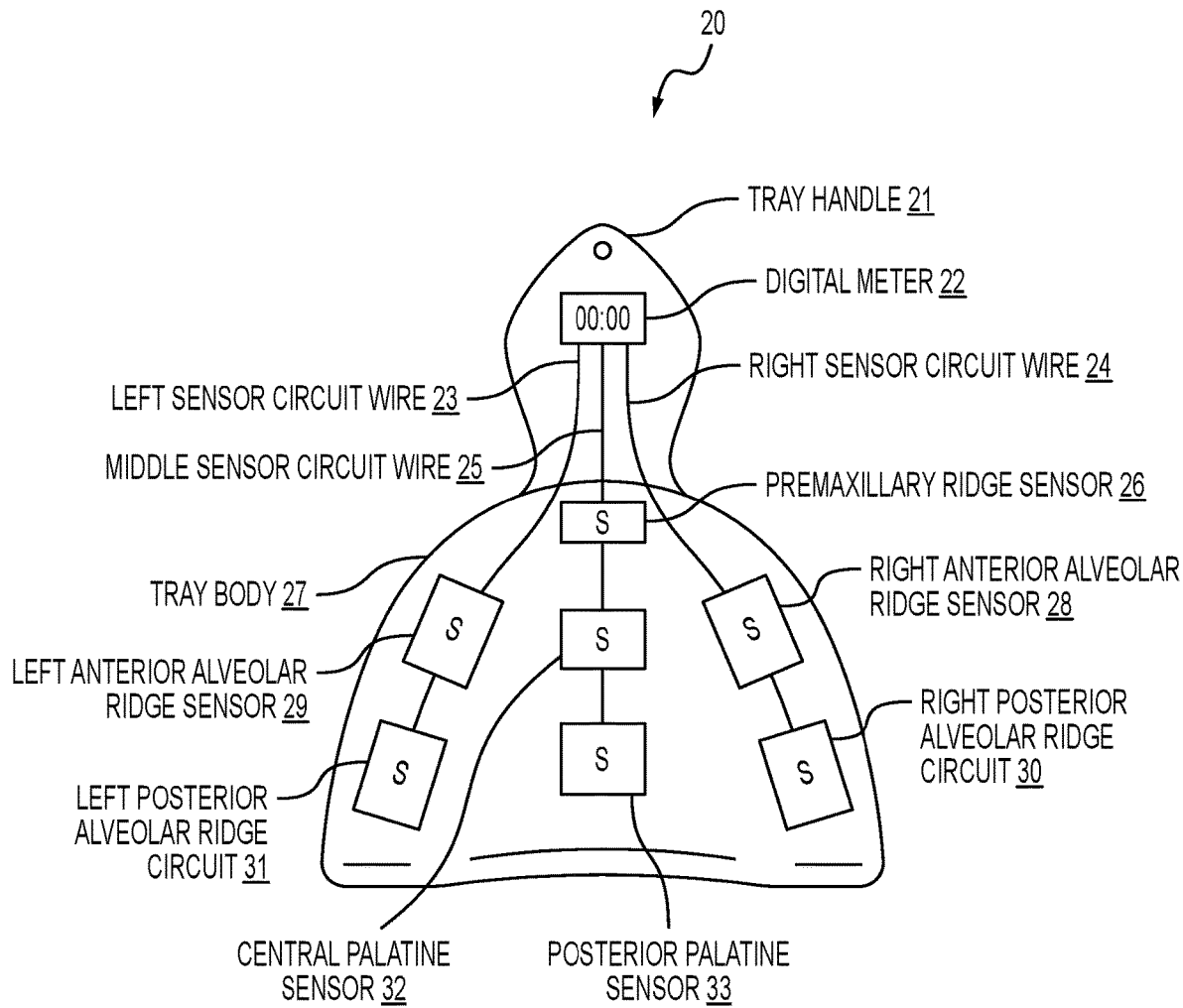
FIG. 2 is a schematic view of the overall structure of the first embodiment of the maxilla arch dental impression tray.

FIG. 2 depicts a first embodiment of a maxillary arch dental impression tray (20) for fabricating a maxillary arch dental impression. The maxillary arch dental impression tray (20) can comprise a tray body (27) and tray handle (21) attached to the tray body (27). The tray handle (21) includes an analog to digital meter (22) which provides real-time feedback of analog pressure inputs from the plurality of pressure sensors (26, 27, 28, 29, 30, 31, 32, and 33) embedded within the tray body (27). The plurality of pressure sensors (26, 27, 28, 29, 30, 31, 32, and 33) are connected to the analog to digital meter (22) by means of a left sensor circuit wire (23), a right sensor circuit wire (24), and a middle sensor circuit wire (25). The left sensor circuit wire (23) is connected to a left anterior alveolar ridge sensor (29) and left posterior alveolar ridge sensor (31). The right sensor circuit wire (24) is connected to a right anterior alveolar ridge sensor (28) and right posterior alveolar ridge sensor (30). The middle sensor circuit wire (25) is connected to a premaxillary ridge sensor (26), a central palatine sensor (32), and a posterior palatine sensor (33).

The analog digital meter (22) is an integral part of the maxillary arch dental impression tray (20) and it operates in tandem with the plurality of plurality of pressure sensors (26, 27, 28, 29, 30, 31, 32, and 33) embedded within the tray body (27). The analog digital meter (22) provides a clear, instantaneous, and selectable display of the force being applied from each sensor and allows the readings of a single sensor to be displayed, or a collection of sensors along at least one of the left sensor circuit wire (23), the right sensor circuit wire (24), and the middle sensor circuit wire (25). This feature allows for the prosthodontist discern and/or confirm a pressure discrepancy along the three important areas of the maxilla.

Figure 3:
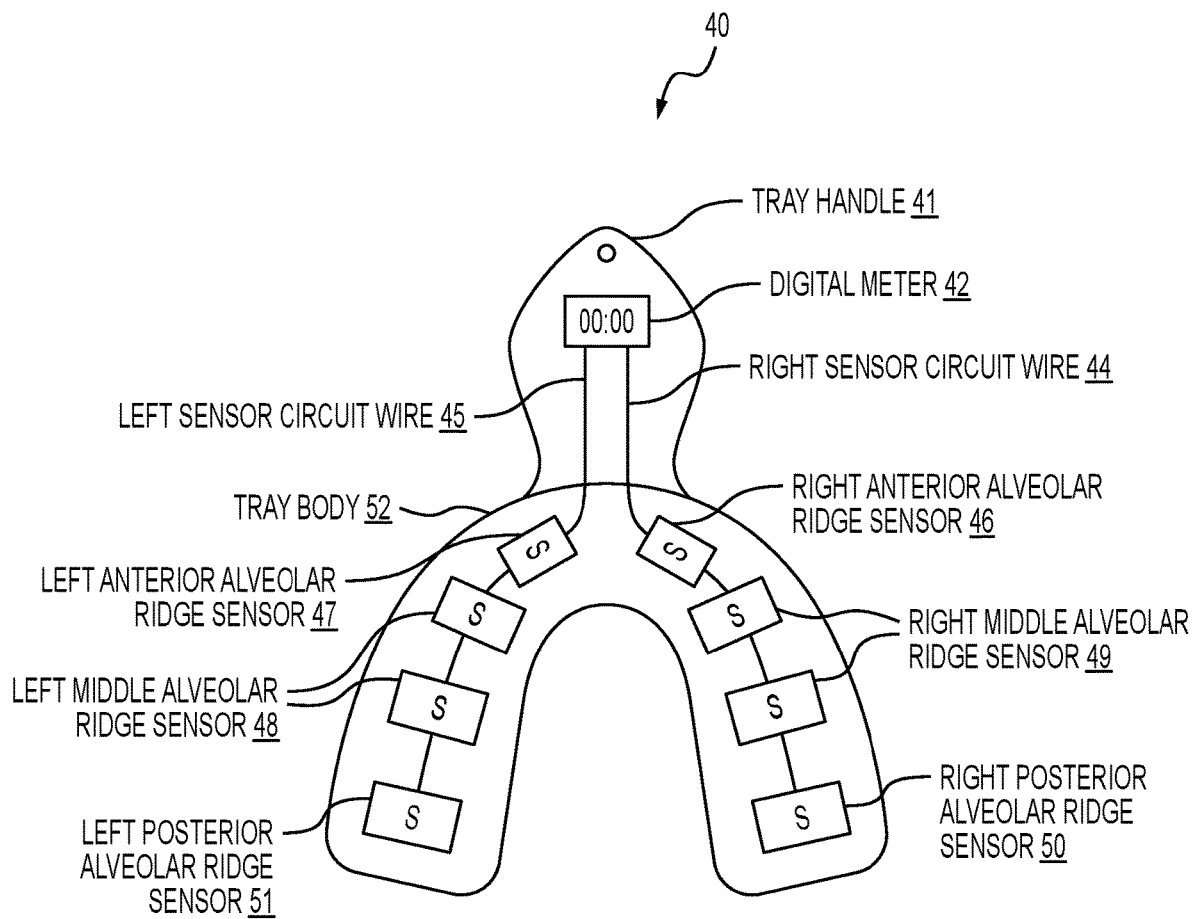
FIG. 3 is a schematic view of the overall structure of the second embodiment of the mandibular arch dental impression tray.

FIG. 3 depicts a second embodiment of a mandibular arch dental impression tray (40) for fabricating a mandibular arch dental impression. The mandibular arch dental impression tray (40) can comprise a tray body (52) and tray handle (41) attached to the tray body (52). The tray handle (41) includes an analog to digital meter (42) which provides real-time feedback of analog pressure inputs from the plurality of pressure sensors (46, 47, 48, 49, 50, 51) embedded within the tray body (52). The plurality of pressure sensors (46, 47, 48, 49, 50, 51) are connected to the analog to digital meter (42) by means of a left sensor circuit wire (45) and a right sensor circuit wire (44). The left sensor circuit wire (44) is connected to a left anterior alveolar ridge sensor (47), two left middle alveolar ridge sensors (48), and a left posterior alveolar ridge sensor (51). The right sensor circuit wire (44) is connected to a left anterior alveolar ridge sensor (46), two left middle alveolar ridge sensors (49), and a left posterior alveolar ridge sensor (50).

The analog digital meter (42) provides a clear and instantaneous and selectable display of the force being applied from each sensor and allows the readings of a single sensor to be displayed, or a collection of sensors along at least one of the left sensor circuit wire (45) and the right sensor circuit wire (44). This feature allows the prosthodontist to discern and/or confirm a pressure discrepancy along the two important areas of the mandibular.

Both embodiments of the trays provide prosthodontists with guidance on the appropriate force levels for various areas of the maxilla and mandible. By seamlessly incorporating established standards and clinical guidelines for dental impressions, the trays offer on-the-spot recommendations for the ideal force to be applied in specific regions. Accordingly, this functionality significantly reduces the likelihood of errors and inconsistencies, ensuring high-quality impressions.

In addition to real-time feedback and guidance, the trays may include data logging capabilities, enabling the recording and storage of relevant data from the impression process. This comprehensive record keeping provides valuable insights for prosthodontists, allowing for a review and analysis of the procedure in minute detail, thereby promoting ongoing improvement and consistency in their practice.

As described herein, it should be noted that, unless explicitly specified and limited otherwise, the terms "mounted," "connected," and "connected" are to be construed broadly, and may be either fixedly connected, detachably connected, or integrally connected, for example; can be mechanically connected, electrically connected or can be communicated with each other; can be directly connected or indirectly connected through an intermediate medium, and can be communicated with the inside of two elements or the interaction relationship of the two elements. The specific meaning of the above terms can be understood by those of ordinary skill in the art according to the specific circumstances.

It should be noted that the terms "horizontal", "vertical", and the like do not denote that the component is required to be absolutely horizontal or vertical but may be slightly inclined. Similarly, the terms "parallel", "perpendicular" and the like also do not denote absolute parallelism or perpendicularity between the fittings but may form an angular offset. As "horizontal" merely means that its direction is more horizontal than "vertical", and does not mean that the structure must be perfectly horizontal, but may be slightly inclined.

Furthermore, references to orientations or positional relationships of the terms "center", "longitudinal", "lateral", "length", "width", "thickness", "upper", "lower", "front", "rear", "left", "right", "vertical", "horizontal", "top", "bottom", "inner", "outer", "clockwise", "counterclockwise", etc., are based on the orientation or positional relationships shown in the drawings, or are orientation or positional relationships conventionally placed when the product of the present invention is used, are merely for convenience in describing embodiments of the presently described subject matter and to simplify description, and do not indicate or imply that the device or element referred to must have a specific orientation, be configured and operated in a specific orientation, and therefore should not be construed as limiting the presently described subject matter.

It is to be understood that the dental impression trays are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A maxillary arch dental impression tray, comprising:
   a tray body;
   a tray handle attached to the tray body;
   an analog to digital meter integral to the tray body;
   a left sensor circuit wire connected to the analog to digital meter and traversing from the analog to digital meter down a left side of the tray body;
   a right sensor circuit wire connected to the analog to digital meter and traversing from the analog to digital meter down a right side of the tray body;
   a middle sensor circuit wire connected to the analog to digital meter and traversing from the analog to digital meter down a middle portion of the tray body;
   a first plurality of sensors embedded within the tray body along the left side of the tray body and connected to the left sensor circuit wire;
   a second plurality of sensors embedded within the tray body along the right side of the tray body and connected to the right sensor circuit wire; and
   a third plurality of sensors embedded within the tray body along the middle portion of the tray body and connected to the middle sensor circuit wire.

2. The maxillary arch dental impression tray as recited in claim 1, wherein the first plurality of sensors, the second plurality of sensors, and the third plurality of sensors are pressure sensors.

3. The maxillary arch dental impression tray as recited in claim 2, wherein the first plurality of sensors, the second plurality of sensors, and the third plurality of sensors are pressure sensors that provide force readings to the analog to digital meter in real-time.

4. The maxillary arch dental impression tray as recited in claim 3, wherein the analog to digital meter selectively displays a force reading from a single sensor of the first plurality of sensors, the second plurality of sensors, or the third plurality of sensors.

5. The maxillary arch dental impression tray as recited in claim 4, wherein the analog to digital meter selectively display a force reading from a single plurality of the first plurality of sensors, the second plurality of sensors, or the third plurality of sensors.

6. The maxillary arch dental impression tray as recited in claim 5, wherein the first plurality of sensors includes a left anterior alveolar ridge sensor and a left posterior alveolar ridge sensor.

7. The maxillary arch dental impression tray as recited in claim 6, wherein the second plurality of sensors includes a right anterior alveolar ridge sensor and a right posterior alveolar ridge sensor.

8. The maxillary arch dental impression tray as recited in claim 7, wherein the third plurality of sensors includes a premaxillary ridge sensor, a central palatine sensor, and a posterior palatine sensor.

9. A mandibular arch dental impression tray, comprising:
   a tray body;
   a tray handle attached to the tray body;
   an analog to digital meter integral to the tray body;
   a left sensor circuit wire connected to the analog to digital meter and traversing from the analog to digital meter down a left side of the tray body;
   a right sensor circuit wire connected to the analog to digital meter and traversing from the analog to digital meter down a right side of the tray body;
   a first plurality of sensors embedded within the tray body along the left side of the tray body and connected to the left sensor circuit wire; and
   a second plurality of sensors embedded within the tray body along the right side of the tray body and connected to the right sensor circuit wire.

10. The maxillary arch dental impression tray as recited in claim 9, wherein the first plurality of sensors and the second plurality of sensors are pressure sensors.

11. The maxillary arch dental impression tray as recited in claim 10, wherein the first plurality of sensors and the second plurality of sensors are pressure sensors that provide force readings to the analog to digital meter in real-time.

12. The maxillary arch dental impression tray as recited in claim 11, wherein the analog to digital meter selectively displays a force reading from a single sensor of the first plurality of sensors, the second plurality of sensors, or the third plurality of sensors.

13. The maxillary arch dental impression tray as recited in claim 12, wherein the analog to digital meter selectively displays a force reading from a single plurality of the first plurality of sensors or the second plurality of sensors.

14. The maxillary arch dental impression tray as recited in claim 13, wherein the first plurality of sensors includes a left anterior alveolar ridge sensor, two left middle alveolar ridge sensors, and a left posterior alveolar ridge sensor.

15. The maxillary arch dental impression tray as recited in claim 14, wherein the second plurality of sensors includes a right anterior alveolar ridge sensor, two right middle alveolar ridge sensors, and a right posterior alveolar ridge sensor.

* * * * *